United States Patent [19]

Ise et al.

[11] 4,307,456
[45] Dec. 22, 1981

[54] ULTRASONIC RANGEFINDER

[75] Inventors: Yukihiko Ise, Toyonaka; Shigeru Hayakawa, Hirakata, both of Japan

[73] Assignee: Matsushita Electric Industrial Co., Ltd., Kadoma, Japan

[21] Appl. No.: 95,489

[22] Filed: Nov. 19, 1979

[30] Foreign Application Priority Data

Nov. 22, 1978 [JP] Japan ................ 53-144698

[51] Int. Cl.$^3$ ............................................. G01S 15/14
[52] U.S. Cl. .................................. 367/107; 367/108; 367/900; 343/5 SM
[58] Field of Search ............... 367/107, 108, 114, 900; 343/5 SM

[56] References Cited

U.S. PATENT DOCUMENTS 2,780,795  2/1957  Ambrosio ........................... 367/108
3,522,764  8/1970  Biber et al. ............................ 95/44
4,169,263  9/1979  Hooker, Jr. ..................... 343/5 SM

FOREIGN PATENT DOCUMENTS 47-48408 12/1972 Japan .
53-45267 4/1978 Japan .

Primary Examiner—Richard A. Farley
Attorney, Agent, or Firm—Cushman, Darby & Cushman

[57] ABSTRACT

An ultrasonic rangefinder providing a correct distance measurement and comprising a first transducer for transducing electric signals into ultrasonic waves and transmitting the ultrasonic waves, a second transducer for receiving the ultrasonic waves and transducing the ultrasonic waves into electric signals, a differentiation circuit, and a comparator for comparing a level of a differentiated output signal from the differentiation circuit with an output signal level of the second transducer and detecting a threshold time when the level of the differentiated output signal from the differentiation circuit becomes lower then the output signal level of the second transducer where a threshold signal level of the comparator is automatically varied with respect to a time lapse of the travelling ultrasonic waves coming back to the rangefinder after being reflected by an object, thus overcoming the conventional problems due to the spurious-like direct waves.

10 Claims, 5 Drawing Figures

ULTRASONIC RANGEFINDER

BACKGROUND OF THE INVENTION

1. Field of the Invention

The present invention relates to a rangefinder using ultrasonic waves.

2. Prior Arts

Various rangefinders have been proposed for ranging by a time difference between a sending time and a receiving time of ultrasonic waves. The conventional rangefinders have the following problems as follows. In general, a receiving microphone for the ultrasonic waves, which is disposed adjacent to an ultrasonic wave speaker, receives direct waves which are other than the ultrasonic reflection waves from a ranging object, and travelling through short space from the speaker to the microphone, although the strength of the direct waves coming back from various directions depends on directivity of the sending speaker. When the sending speaker and the receiving microphone are both mounted on a same supporter or a frame, solid waves are also transmitted through a direct path in the supporter from the speaker to the microphone. In the conventional rangefinders, an amplification degree of a signal for the reflection waves is selected to be sufficient for receiving a small intensity signal produced by the reflection waves from the object of a maximum range distance $L_{max}$. But in such a case, the direct waves may come back to the rangefinder earlier than the correct reflection waves and even small direct waves may be amplified well to result in a pseudo-signal which is erroneously used for the time difference determination. This problem would be resolved by decreasing the amplification degree for the direct waves, but paradoxically the maximum range distance also becomes shorter by such a measure. Therefore, the conventional rangefinders have been subject to the problems of the direct waves. The conventional rangefinders have a further drawback that circuit configurations are complicated.

SUMMARY OF THE INVENTION

The present invention provides a rangefinder free from the conventional problems arising from the undesirable direct waves, wherein a signal level for detecting a right signal due to the reflection waves from a ranging object is automatically varied and the detection of the right signal is made by the time-dependent signal level.

DESCRIPTION OF THE PREFERRED EMBODIMENTS

The present invention provides an ultrasonic rangefinder comprising a first transducer for transducing electric signals into ultrasonic waves and transmitting said ultrasonic waves, a second transducer for receiving said ultrasonic waves and transducing said ultrasonic waves into electric signals, a first timer means for determining a starting time for transmitting said ultrasonic waves, a carrier frequency generator for generating a carrier signal of a frequency of said ultrasonic waves, a second timer means for generating a pulse having a time width at least longer than a time corresponding to a travelling time of said ultrasonic waves from said first transducer to said second transducer at the time when said first transducer begins to transmit said ultrasonic waves, a differentiation circuit for differentiating said pulse of said second timer means, and a comparator for comparing a level of said differentiated output signal from said differentiation circuit with an output signal level of said second transducer and detecting a threshold time when said level of said differentiated output signal from said differentiation circuit becomes lower than said output signal level of said second transducer.

Figure 1:
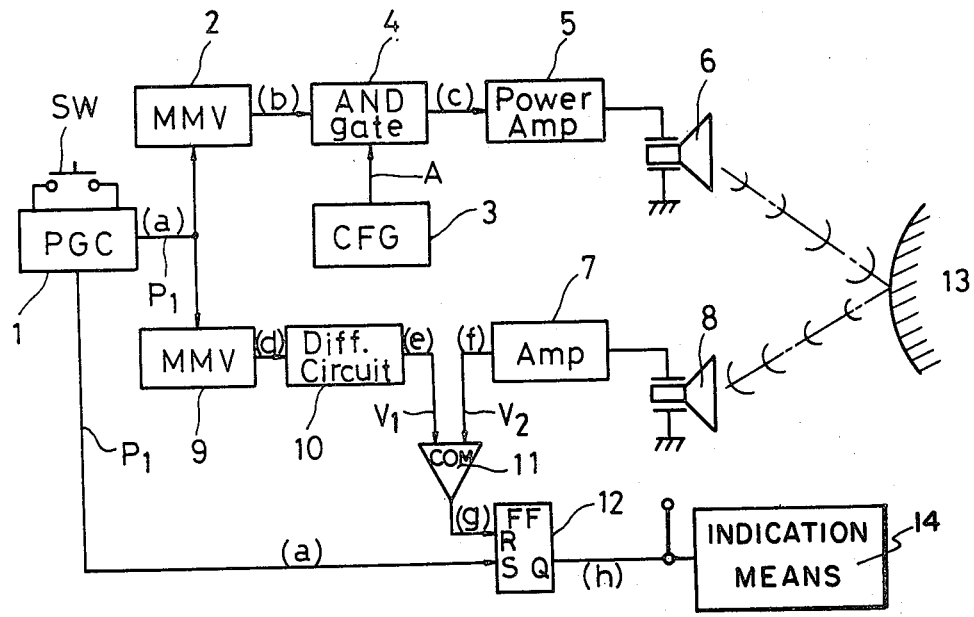
FIG. 1 is a block diagram of an ultrasonic rangefinder in accordance with the present invention.
Figure 2:
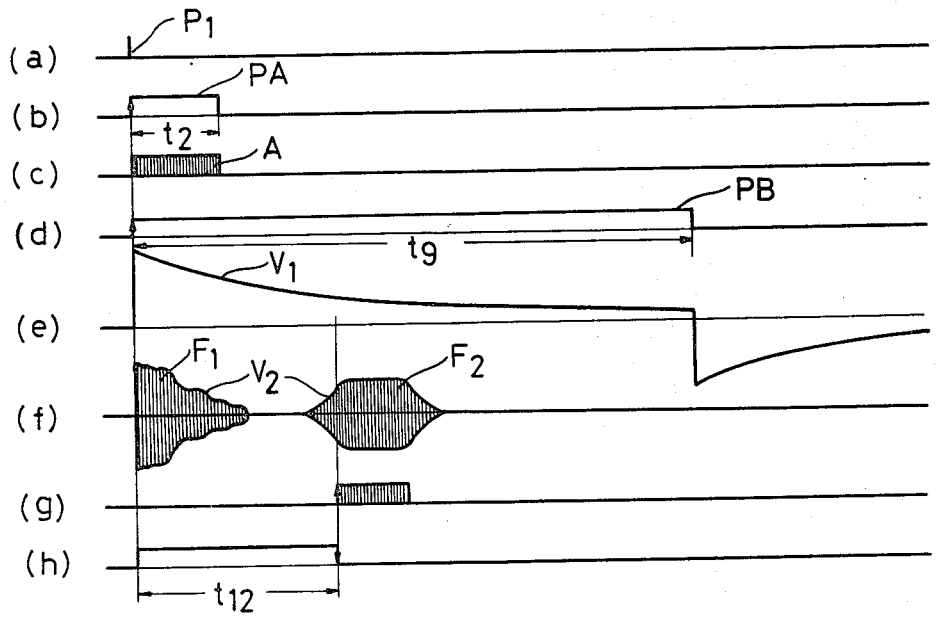
FIG. 2 is a timing chart showing signals designated by curves (a)-(h) of the outputs of several blocks shown in FIG. 1.

The preferred embodiment of the present invention is elucidated by referring to the accompanying drawings. FIG. 1 is a block diagram of an ultrasonic rangefinder in accordance with the present invention. FIG. 2 is a timing chart showing signals designated by curves (a)-(h) in several blocks of FIG. 1. A pulse generating circuit (PGC) 1 of FIG. 1 generates one start pulse $P_1$ shown by the curve (a) of FIG. 2 every time a switch SW is turned on. A first monostable multivibrator (MMV) 2 serves as a first timer means, is triggered by the start pulse $P_1$, and generates an output signal which has a high logic level part PA for a time period of $t_2$ as shown by the curve (b) of FIG. 2. A carrier frequency generator (CFG) 3 continuously generates a signal of a carrier wave frequency used for the ultrasonic rangefinding. An AND gate circuit 4 passes the continuously generated signal for the time period $t_2$ and gives a burst signal A shown in the curve (c) of FIG. 2. Therefore, the burst signal A lasts only during the time period $t_2$ when the output signal of the monostable multivibrator (MMV) 2 is at the high logic level. A power amplifier 5 amplifies the burst signal A of an ultrasonic frequency, thereby driving a transducer such as a speaker 6 for producing the ultrasonic waves. An ultrasonic wave is reflected by an object 13 and reaches a microphone 8 which converts the ultrasonic wave into an electric signal. An amplifier 7 amplifies the electric signal sent out from the microphone 8. A center frequency of the amplifier 7 is set to be the ultrasonic frequency of the burst signal A, namely the carrier frequency generator (CFG) 3, so that the reflected ultrasonic signal only is amplified thereby.

Figure 3:
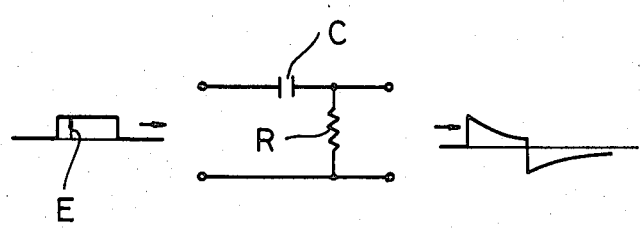
FIG. 3 is a circuit diagram of a typical differentiation circuit together with input and output signal waveforms.

A second monostable multivibrator (MMV) 9 serves as a second timer means, is triggered by the abovementioned start pulse $P_1$, and generates an output signal PB having a high logic level for a time period $t_9$ as shown by the curve (d) of FIG. 2. A differentiation circuit 10 having a relatively long predetermined time constant differentiates the output signal of the second monostable multivibrator (MMV) 9. FIG. 3 is a circuit diagram showing a typical differential circuit together with input and output signal waveforms. The differentiation circuit 10 generates a signal $V_1$ changing its waveform exponentially as shown by the curve (e) of FIG. 2. An analog comparator 11 compares the voltage of the signal $V_1$ of the differentiation circuit 10 with that of an output signal $V_2$ of the amplifier 7, and inverts a logic level of an output signal to a high logic level when the voltage of the signal $V_1$ is lower than that of the signal $V_2$. A flip-flop (FF) 12 has been previously set by the abovementioned start pulse $P_1$ thereby holding its output signal shown by the curve (h) of FIG. 2 at a high logic level until the output signal of the analog comparator 11 is inverted to the high logic level.

When the switch SW is turned on, the ultrasonic waves are generated from the speaker 6 during the time period $t_2$. They reach the object 13 and are reflected from the object 13. Then, the microphone 8 detects the reflected ultrasonic waves thereby generating an electric signal, which is then selectively amplified by the amplifier 7. The output signal $V_2$ of the amplifier 7 is an analog signal $F_2$ shown by the curve (f) of FIG. 2.

The output signal $V_1$ of the differentiation circuit 10 is expressed by using the input signal thereof, i.e. an output signal E of the second monostable multivibrator (MMV) 9 as, $$V_1 = Ee^{-\frac{t}{CR}}, \tag{1}$$

where C and R are a capacitance and a resistor of the differentiation circuit 10, respectively, and t is the time. The equation (1) can be approximately expanded to result in $$V_1 = E\left[1 - \frac{t}{CR} + \frac{1}{2!}\left(\frac{t}{CR}\right)^2 - \frac{1}{3!}\left(\frac{t}{CR}\right)^3\right]. \tag{2}$$

The level of the signal $V_2$ in proportion to the received ultrasonic waves also decays as the time passes. Therefore, it is necessary that the sensitivity of the analog comparator (COM) 11 complies with a distance from the rangefinder to the object 13 (in other words, with the time required for the ultrasonic waves to be reflected from the object 13 and to return to the rangefinder). For this purpose, the output signal of the flip-flop (FF) 12 is turned to a low logic level when the signal $V_2$ by the received ultrasonic waves becomes higher than the output signal $V_1$ of the differentiation circuit 10 after a predetermined time $t_{12}$ from the time when the flip-flop (FF) 12 is set by the start pulse $P_1$. An indication means 14 is used to display a time period during which the logic level of the flip-flop 12 is at the high logic level. Suitable indicating means are known to those in this art and could, for example, be a counter. It is a known technique to display a value responding to a distance by selecting a clock pulse frequency used for the counting.

Figure 4:
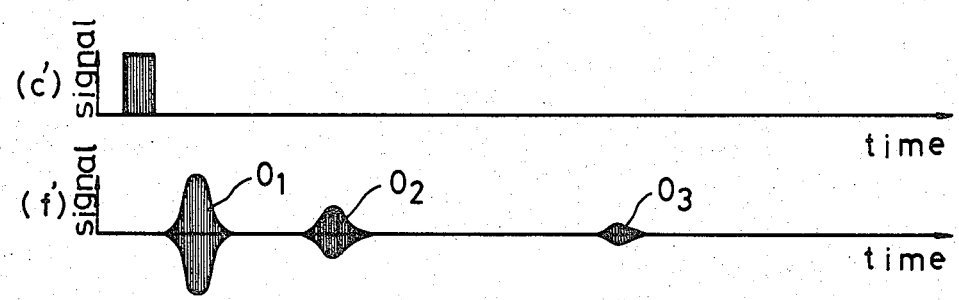
FIG. 4 is a graph showing waveforms of ultrasonic wave signals versus time.

The sound wave propagation velocity v (m/sec) in the air is expressed by $$v = 331 + 0.9T \tag{3},$$

where T is the temperature in centigrade. A distance L(m) from the rangefinder to the object 13 can be calculated by $$L = \tfrac{1}{2}vt_{12} \tag{4},$$

where $t_{12}$ is the time corresponding to the time from the sending to the receiving of the ultrasonic waves. The relationship between the sound strength of the received ultrasonic waves and the distance L is that the former is inversely proportional to the latter. Therefore, when an ultrasonic wave pulse shown by a curve (c') of FIG. 4 is used for the rangefinding of three different objects $O_1$, $O_2$ and $O_3$ positioned at different places distant from the rangefinder, the sound strength of the received ultrasonic waves decreases in accordance with the distances of the objects from the rangefinder as shown by a curve (f') of FIG. 4, even when the reflection coefficients of the objects are equal to each other.

The rangefinder in accordance with the present invention uses the output signal $V_1$ of the differentiation circuit 10 as a threshold value of the analog comparator (COM) 11. The output signal $V_1$ is time-dependent as described above, and therefore the rangefinder in accordance with the present invention is devised in such a manner that the threshold value used for the comparison in the analog comparator (COM) 11 is automatically varied in accordance with the time required for the ultrasonic waves to reach the rangefinder after the reflection.

When the direct waves are received by the microphone 8 immediately after the ultrasonic waves are transmitted from the speaker 6 and before the reflection waves are received by the microphone 8, the amplifier 7 produces a spurious output signal $F_1$ in the curve (f) of FIG. 2. At this time, the signal $V_1$ is higher than the spurious output signal $F_1$ so that the comparator 11 does not generate the inverted high level signal. Accordingly, it is possible to remove effects of undesirable spurious electric signals induced by the direct ultrasonic waves. It is thus possible to correctly carry out the rangefinding even for the object positioned at an extremely proximate place from the rangefinder.

It is naturally that the speaker 6 for producing the ultrasonic waves and the microphone 8 for receiving the ultrasonic waves are transducers designed for the ultrasonic wave range having the most preferable electric-mechanical and mechanic-electrical conversion efficiency values in the ultrasonic frequency range controlled by the carrier frequency generator (CFG) 3.

In the timing chart of FIG. 2 analog signal parts are enlarged in the time axis. When the oscillation frequency of the carrier frequency generator (CFG) 3 is set to be 40 KHz, the predetermined time period $t_2$ of the first monostable multivibrator (MMV) 2 be 2 m sec and the maximum setting distance value be 3.4 m, then the predetermined time period $t_9$ of the second monostable multivibrator (MMV) 9 becomes 20 m sec.

It is possible that the ultrasonic rangefinder in accordance with the present invention further comprises a display means (not shown in FIG. 1) to indicate that the ultrasonic rangefinder is unable to measure the object distance when the output signal (h) of the flip-flop (FF) 12 does not invert the output signed within the predetermined time period $t_9$ of the second monostable multivibrator (MMV) 9 (i.e. the reflection waves are not obtained within the predetermined time period $t_9$).

It is further possible to provide a counter means in the ultrasonic rangefinder of the present invention by using a suitable clock signal and the output signal (h) of the flip-flop (FF) 12 as a gate signal.

Figure 5:
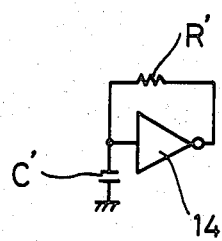
FIG. 5 is a circuit diagram of a known simple oscillator circuit.

FIG. 5 is a circuit diagram showing a known simple oscillation circuit comprising a capacitor C', a resistor R' and an inverter 14. Such an oscillation circuit is applicable to the first and second monostable multivibrators 2 and 9. An oscillation frequency of the oscillation circuit is variable by selecting a suitable time constant of the capacitor C' and the resistor R'. It is therefore possible to remove a temperature-dependent effect of the sound velocity from the measured distance value by using a temperature-sensitive device such as a thermistor instead of the resistor R' in such a manner that the frequency dependence of the clock signal on the temperature coincides with the sound velocity dependence on the temperature expressed by the equation (3). It is still further possible to employ the oscillation circuit of FIG. 5 as the carrier frequency generator (CFG) 3 when the temperature compensation is made therein, since the frequency characteristics of the speaker 6 and the microphone 8 and the frequency characteristics of the amplifier 7 are not affected within the variable range of the sound velocity expressed by the equation (3).

When the oscillation frequency of the carrier frequency generator 3 is set to be around 34 KHz, the distance corresponding to one cycle of the ultrasonic waves is 1 cm (assuming the temperature is around 10° C.). Thus a direct indication in centimeter unit is possible by using a signal as a counter clock signal for the time period $t_{12}$ after dividing the signal of the carrier frequency generator (CFG) 3 to get the signal of the frequency of a half of the oscillation frequency. It is preferable that the time period $t_2$ of the first monostable multivibrator (MMV) 2 for determining a pulse width of the transmitting ultrasonic waves is set to be a value equal to or slightly longer than response times of the speaker 6 and microphone 8, which response times are given by the mechanical Q values thereof.

The ultrasonic rangefinder of the present invention provides a possibility of a correct distance measurement with a simple circuit constitution where the threshold signal level of the analog comparator 11 to the reflection waves is automatically varied with respect to the time lapse of the travelling of the ultrasonic waves thus overcoming the conventional problems due to the direct waves.

What is claimed is:

1. An ultrasonic rangefinder comprising:
 a first transducer for transducing electric signals into ultrasonic waves and transmitting said ultrasonic waves,
 a second transducer for receiving said ultrasonic waves and transducing said ultrasonic waves into electric signals,
 a first timer means for determining a starting time for transmitting said ultrasonic waves,
 a carrier frequency generator for generating a carrier signal of a frequency of said ultrasonic waves,
 a second timer means for generating a pulse having a time width at least as long as a time corresponding to a travelling time of said ultrasonic waves from said first transducer to said second transducer at the time when said first transducer begins to transmit said ultrasonic waves,
 a differentiation circuit for differentiating said pulse of said second timer means, and
 a comparator for comparing a level of said differentiated output signal from said differentiation circuit with an output signal level of said second transducer and detecting a threshold time when said level of said differentiated output signal from said differentiation circuit becomes lower than said output signal level of said second transducer.

2. An ultrasonic rangefinder in accordance with claim 1 wherein said carrier frequency generator comprises a compensation means for compensating changes of a sound velocity due to the temperature variations by changing said carrier signal frequency.

3. An ultrasonic rangefinder in accordance with claim 1 or 2 wherein said carrier signal frequency is a frequency around 34 KHz.

4. An ultrasonic rangefinder in accordance with claim 1 wherein said second timer means is for generating a pulse having a time width longer than a time corresponding to a travelling time of said ultrasonic waves from said first transducer to said second transducer at the time when said first transducer begins to transmit said ultrasonic waves.

5. An ultrasonic rangefinder comprising:
 a first transducer for transducing electric signals into ultrasonic waves and transmitting said ultrasonic waves,
 a second transducer for receiving said ultrasonic waves and transducing said ultrasonic waves into electric signals,
 a first timer means for determining a starting time for transmitting said ultrasonic waves,
 a carrier frequency generator for generating a carrier signal of a frequency of said ultrasonic waves,
 a second timer means for generating a pulse having a time width at least as long as a time corresponding to a travelling time of said ultrasonic waves from said first transducer to said second transducer at the time when said first transducer begins to transmit said ultrasonic waves,
 a differentiation circuit for differentiating said pulse of said second timer means,
 a comparator for comparing a level of said differentiated output signal from said differentiation circuit with an output signal level of said second transducer and detecting a threshold time when said level of said differentiated output signal from said differentiation circuit becomes lower than said output signal level of said second transducer,
 a logic gate for passing a burst signal made from a pulse signal of said first timer means and said carrier signal of said carrier frequency generator,
 a first amplifier for amplifying said burst signal, and
 a second amplifier for amplifying said electric signals of said second transducer.

6. An ultrasonic rangefinder in accordance with claim 5 further comprises a flip-flop for being set at the time when said first transducer begins to transmit said ultrasonic waves and being then reset by an output signal of said comparator.

7. An ultrasonic rangefinder in accordance with claim 5 or 6 wherein said carrier frequency generator comprises a compensation means for compensating changes of a sound velocity due to the temperature variations by changing said carrier signal frequency.

8. An ultrasonic rangefinder in accordance with claim 5 or 6 wherein said carrier signal frequency is a frequency around 34 KHz.

9. An ultrasonic rangefinder in accordance with claim 7 wherein said second timer means is for generating a pulse having a time width longer than a time corresponding to a travelling time of said ultrasonic waves from said first transducer to said second transducer at the time when said first transducer begins to transmit said ultrasonic waves.

10. An ultrasonic rangefinder in accordance with claim 5 or 6 further comprising an indication means for indicating a distance value.

* * * * *